May 8, 1956
H. E. KARIG
2,744,485
TORPEDO DEPTH CONTROL
Filed June 10, 1948
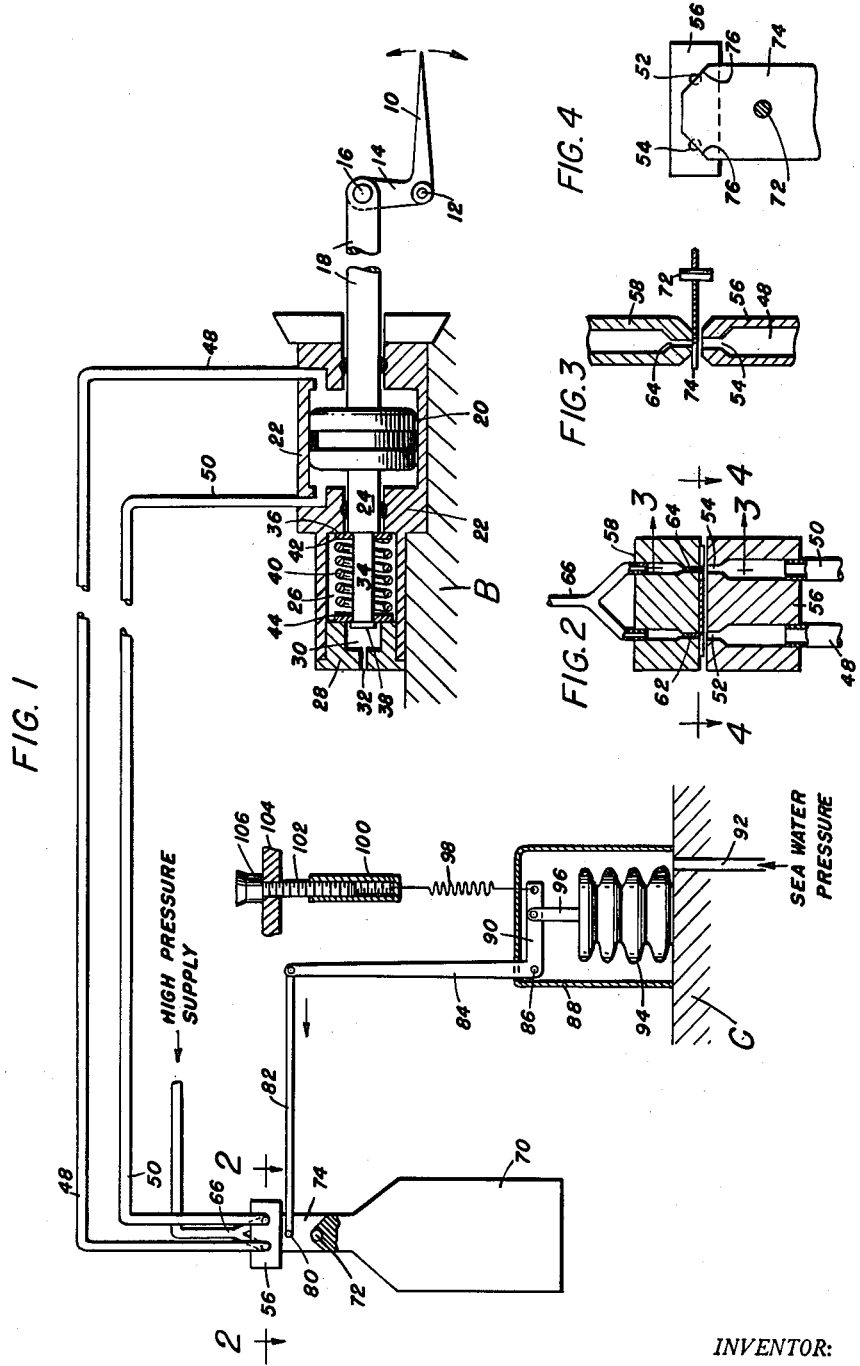
INVENTOR:
HORACE E. KARIG
BY
M. C. Hayes
ATT'Y 2,744,485

TORPEDO DEPTH CONTROL

Horace E. Karig, Pasadena, Calif., assignor to the United States of America as represented by the Secretary of the Navy Application June 10, 1948, Serial No. 32,201

1 Claim. (Cl. 114—25)

This invention relates to a depth control system and apparatus in which a movable blade forms an intercepter between two fluid pressure jets and orifices so that reaction forces are opposed and balanced.

An important object of the invention is to provide a depth control system utilizing a pendulum for actuating a cut-off blade to obtain proportionality of the application of the balancing force to operate a rudder with the output force from the controlled supply, over a predetermined range.

A further object of the invention is to provide a more accurate proportionality range of the pressure by spring loading on the depth engine.

Still a further object of the invention is to provide a simple and efficient system of depth control including a spring adjusted hydrostat linked to a pendulum moved by tilting or depth adjustment to vary the proportional cut-off to opposite ends of a double acting pressure operated depth engine.

Other objects of the invention will appear in the specification and will be apparent from the accompanying drawings, in which Fig. 1 is a diagrammatic representation of a depth control system for a torpedo in accordance with the present invention;

Fig. 2 is a sectional plan view of the jet interceptor as taken on a line 2—2 of Fig. 1;

Fig. 3 is a sectional view taken on the line 3—3 of Fig. 2; and

Fig. 4 is a transverse sectional view taken on the line 4—4 of Fig. 2.

Referring more particularly to the drawings a horizontal elevator rudder 10 is mounted upon a horizontal pivot 12 and is represented as a bell-crank having an arm 14 connected by a pivot 16 with one extremity of a piston rod 18. The piston rod is connected to a piston 20 movable in a cylinder 22 having a fixed support B which may be the shell or framework of the torpedo.

A piston rod 24 extends from the opposite side of the piston 20 into a chamber 26 formed as an extension of the cylinder with a closure cap 28 at the outer end having an inside recess 30 and a relief hole 32 extending through the cap. The piston rod 24 has a reduced portion 34 movable in the chamber 26, with a shoulder 36 at the inner end and a projection 38 at the outer end. A partially expanded loading coil spring 40 is mounted on the reduced portion 34 with a washer 42 at one end abutting the shoulder 36 and a washer 44 abutting the end projection 38.

The end of the piston rod 24 extends freely into the recess 30 and the spring 40 is compressed between its washers 42 and 44, opposing the movement of the piston in the corresponding direction, where the outer washer engages the inner end of the projection 38, and where the inner washer engages the end wall of the cylinder 22. The loading spring 40 is a centralizing force tending to return the rudder to neutral position before complete reversal of the air pressure from the control elements.

Extending from opposite ends of the cylinder 22 at opposite sides of the piston 20 are pipes 48 and 50 leading to parallel openings or orifices 52 and 54 in a fixed orifice block 56. Spaced therefrom is a fixed jet block 58 having jet openings 62 and 64 opposite to and slightly smaller in diameter than the corresponding orifice openings 52 and 54. For example, jet openings having a diameter of twenty-four (.024") thousandths of an inch and orifice openings of thirty (.030") thousandths of an inch are found satisfactory to operate the depth engine with a space between them of (.015") fifteen thousandths of an inch. Connected to the orifice block by a Y fitting 66 is a high pressure fluid supply source.

A pendulum 70 is mounted to swing upon a fixed pivot 72 below the blocks 56 and 58 and a cut-off blade 74 extends from the pendulum into the space between the blocks. The upper corners of the blade may be omitted to provide angular cut-offs 76 to more easily center the corner edges over each jet when the control means is in neutral position and to avoid operational lag. The blade 74 should be kept close to the jet block to reduce air leakage from that portion of the jet openings covered by the blade, and maximum clearance is desirable on the orifice side to allow sufficient space for exhausting air from the cylinder 22 with a total space between the blocks of (.015") fifteen thousandths of an inch, a cut-off blade (.008") eight thousandths of an inch in thickness allows a total clearance of (.007") seven thousandths of an inch.

Connected to the pendulum by a pivot 80 at a distance upwardly from the pendulum pivot 72, is a link 82 pivoted at one end to the pendulum and at the other end to one end of a single bell crank lever having an arm 84 and an arm 90. The bell crank lever is pivotally mounted to casing 88 as by a pivot 86. The casing 88 is slotted to accommodate pivotal movement of the bell crank lever, but since lateral movement of arm 84 adjacent pivot 86 is small, the necessary clearance slot in casing 86 is small and cannot clearly be shown. The interior of the casing is connected by a depth pressure passage 92 through the bottom C of a torpedo, and a metal bellows 94, preferably under vacuum, is mounted in the casing to provide a closed reference pressure chamber.

Extending from the bellows is an arm 96 connected intermediate the ends of the arm 90. One end of a coil spring 98 is connected to the outer end of the arm 90, the other end of the spring extends out of the casing 88, and is connected to one end of an internally threaded sleeve 100. An adjusting screw 102 is threaded into the other end of the sleeve and extends through a fixed support 104 with an adjustng knob 106 at the other side of the support.

In operation the depth spring 98 is adjusted by means of the knob 106 to vary the tension applied to arm 90 as it relates to the reference pressure in the bellows 94. This varies the depth of the torpedo at which the depth pressure through the passage 92 becomes effective in the casing 88 to actuate the arm 90 and its connected arm 84 which moves the pendulum accordingly through the link 82.

If the fore end of the torpedo is inclined upwardly, the pendulum 70 will swing rearwardly, and if the torpedo is traveling at too high a level, the lighter pressure in the casing 88 will affect the depth spring 98 and the bellows 94 to raise the arm 90 thereby swinging the pendulum in the same direction (rearwardly) as if the fore end of the torpedo is inclined upwardly. This will cause the cut-off blade 74 to swing over the jet and orifice openings 52 and 62 and to uncover corresponding jet and orifice openings 54 and 64 to a greater or lesser extent depending upon the movement of the pendulum. Fluid under pressure is thus admitted from the source of supply through jet block 58 and jet opening 54 into orifice opening 64 in block 56 and thence through pipe 48 to the fore end of the cylinder 22. This pushes the piston rearwardly against the centering pressure of the spring 40 and moves the rudder 10 downwardly on its pivot 16, which causes the fore end of the torpedo to be inclined downwardly until it reaches a predetermined lower level.

If the torpedo is operating at too low a level, or if the fore end is inclined downwardly, the pendulum is swung forwardly and pressure is similarly admitted to the cylinder 22 at the opposite end to swing the rudder 10 upwardly. In either operation the exhaust end of the cylinder is connected through pipe 50 or 48 to the exhaust space between the blade 74 and the proper opening of the orifice block.

In either case, after a raising or lowering movement of the torpedo, the rudder tends to return to a level position when the pendulum swings to neutral or vertical position, and the loading spring 40 assists in returning and maintaining the rudder in a horizontal position. It is desirable to keep the fluid pressure lines as short as possible and to restrict the volume of the cylinder 22 in order to reduce phase lag in the operation of the rudder. A shorter pendulum results in cycles of higher frequency which tends to reduce waviness in operation, but a depth regulation of plus or minus one foot is obtained even without spring loading.

With this construction which includes a loading spring (or springs) in connection with the piston, a movement of the piston and rudder is obtained which is proportional to the deflection of the pendulum due either to inclination or depth deviation.

Although this construction has been described in detail, it should be regarded as an illustration or example and not as a restriction or limitation of the invention, as many changes in the construction, combination, and arrangement of the parts may be made without departing from the spirit and scope of the invention.

I claim:

A depth control for torpedoes, comprising a horizontal rudder and fluid pressure means for moving it in opposite direction, a pendulum mounted to swing fore and aft in the torpedo, a source of fluid pressure supply, a pair of jets connected to said supply, a pair of receiving orifices spaced from and aligned with said jets to receive pressure therefrom and connected to the fluid pressure means to operate the latter in opposite directions, a blade formed on the pendulum and movable between the jets and orifices to cover one jet and uncover the one in accordance with the swinging movement of the pendulum, and a closed casing connected to receive outside depth pressure, an evacuated bellows in the casing having a projecting arm, the outside of said bellows receiving said outside pressure, a lever pivotally mounted intermediate its ends to said arm and having one end pivotally connected by linkage means to the pendulum, and adjustable spring tension means connected to the other end of the lever to vary the movement of the pendulum in accordance with the spring setting and the depth pressure received by the casing.

References Cited in the file of this patent

UNITED STATES PATENTS

| | | |
|---|---|---|
| 1,659,653 | Hammond, Jr. et al. | Feb. 21, 1928 |
| 1,818,708 | Hammond, Jr. | Aug. 11, 1931 |
| 2,104,627 | Manteuffel | Jan. 4, 1938 |
| 2,143,139 | Carlson | Jan. 10, 1939 |
| 2,176,807 | Wunsch | Oct. 17, 1939 |
| 2,341,644 | Moller | Feb. 15, 1944 |
| 2,498,284 | Leonard | Feb. 21, 1950 |

FOREIGN PATENTS

| | | |
|---|---|---|
| 237 | Great Britain | 1910 |
| 458,823 | Great Britain | Dec. 28, 1936 |